United States Patent
Nusier et al.

(10) Patent No.: US 9,199,592 B1
(45) Date of Patent: Dec. 1, 2015

(54) CRASH BOX

(71) Applicant: Ford Global Technologies, LLC, Dearborn, MI (US)

(72) Inventors: Saied Nusier, Canton, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/532,170

(22) Filed: Nov. 4, 2014

(51) Int. Cl.
*B60R 19/34* (2006.01)
*B60R 19/36* (2006.01)

(52) U.S. Cl.
CPC ..................... *B60R 19/36* (2013.01)

(58) Field of Classification Search
CPC ........ B60R 19/24; B60R 19/26; B60R 19/34; B60R 2019/24; B60R 2019/26
USPC ................................. 293/133, 155
See application file for complete search history.

(56) References Cited

U.S. PATENT DOCUMENTS

| | | | | |
|---|---|---|---|---|
| 3,887,223 A | * | 6/1975 | Bez | 293/133 |
| 4,336,868 A | * | 6/1982 | Wilson et al. | 188/376 |
| 6,779,821 B2 | * | 8/2004 | Hallergren | 293/133 |
| 7,823,939 B2 | | 11/2010 | Handing et al. | |
| 8,287,013 B2 | * | 10/2012 | Kano et al. | 293/133 |
| 8,430,437 B2 | * | 4/2013 | Asakawa et al. | 293/133 |
| 2010/0148526 A1 | * | 6/2010 | Karlander | 293/155 |
| 2013/0076051 A1 | * | 3/2013 | Baldwin | 293/133 |
| 2013/0221692 A1 | | 8/2013 | Wang et al. | |
| 2014/0175816 A1 | | 6/2014 | Marur et al. | |

FOREIGN PATENT DOCUMENTS

| | | | |
|---|---|---|---|
| DE | 2416779 | * | 10/1975 |
| EP | 2039592 A1 | | 3/2009 |
| FR | 2909618 A1 | | 6/2008 |
| GB | 2422136 A | | 7/2006 |
| JP | 2009107408 A | | 5/2009 |
| JP | 4443954 B2 | | 3/2010 |
| JP | 4685818 B2 | | 5/2011 |
| JP | 5244648 B2 | | 7/2013 |

\* cited by examiner

*Primary Examiner* — Dennis H Pedder
(74) *Attorney, Agent, or Firm* — Jason C. Rogers; Bejin Bieneman PLC

(57) ABSTRACT

A crash box for connecting a bumper of a vehicle to a frame member of the vehicle is disclosed. The crash box includes a first crash box component made of metal with one end attached to the bumper and a second end attached to the frame member and forming an inner region. The crash box includes a second crash box component made of reinforced polymer. The second crash box component extends within the inner region of the first crash box and defines a length. The second crash box component has a uniform cross section along the length.

19 Claims, 8 Drawing Sheets

CRASH BOX

BACKGROUND

Crash boxes for absorbing energy from impacts are key components of the impact energy management performance of a vehicle. While it is desirable to increase the energy absorption, e.g. the crush distance of crash boxes, packaging and other design considerations may limit the available length for a crash box in a vehicle. In addition, there is an increasing demand for reduction in the weight of vehicles in order to improve the fuel efficiency. Accordingly, a crash box which meets or exceeds energy absorption targets during a crash without increasing in size and without adding weight, or with a reduction in weight, is desirable, but currently difficult.

DETAILED DESCRIPTION

The crash boxes according to the principles of the present disclosure provide energy absorption during a crash through both the first crash box components or outer sleeves and the second crash box components or inner tubes. The first crash box components are made of metal, absorb energy through deformation during a crash, maintain a connection between the bumper and frame rails, respectively, upon deformation, and secure and align the second crash box components. The second crash box component are made of reinforced polymer, absorbs energy through defragmentation, the process of breaking into small pieces. Accordingly, the second crash box components may be more efficient in absorbing energy from a weight perspective. Disposing the second crash box components at least partially within the first crash box components enables an impact force to be directed along the length of the second crash box component to utilize the energy absorption capacity of the second crash box component, while maintaining a connection between the bumper and frame rails.

Figure 1:
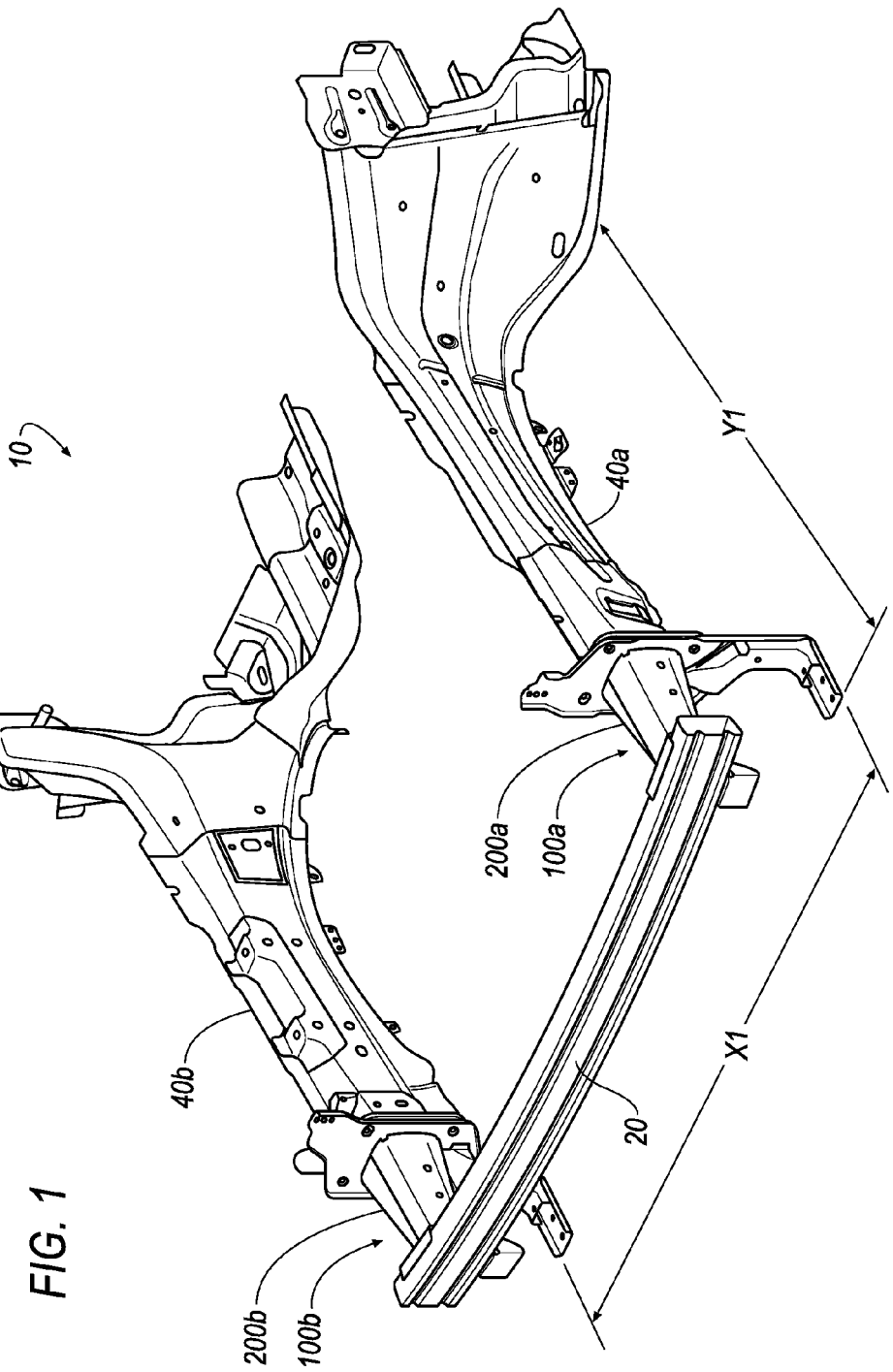
FIG. 1 is a perspective view of a partial vehicle frame assembly including a crash box according to the principles of the present disclosure.

With reference to the Figures, wherein like numerals indicate like parts throughout the several views, and with particular reference to FIG. 1, an exemplary partial vehicle frame assembly 10 includes a bumper 20. The bumper 20 extends in a lateral direction x1 and is connected at each side to one of frame members 40a, 40b via one of crash boxes 100a, 100b. The bumper 20 may be made of metal, hardened plastic, etc.

The frame members 40a, 40b extend in a longitudinal direction y1 along sides of the vehicle. The frame members 40a, 40b may each be made of hardened steel, aluminum, composite materials, etc. It should be understood that the description herein of one of the frame members 40a, 40b or a component, feature and/or arrangement thereof similarly applies to the other and therefor repetition of common components, features, and/or arrangements is avoided herein.

The crash boxes 100a, 100b connect frame members 40a, 40b to the bumper 20. The first and second crash boxes 100a, 100b respectively include first crash box components or outer sleeves 200a, 200b and second crash box components or inner tubes 300a (FIGS. 3, 4A, 4B, and 6), 300b (not shown). It should be understood that the description herein of one of the crash boxes 100a, 100b or a component, feature and/or arrangement thereof, e.g. first crash box components/outer sleeves 200a, 200b and/or the second crash box components/inner tubes 300a, 300b, similarly applies to the other, and, therefore, repetition of common components, features and/or arrangements is avoided herein.

Figure 2:
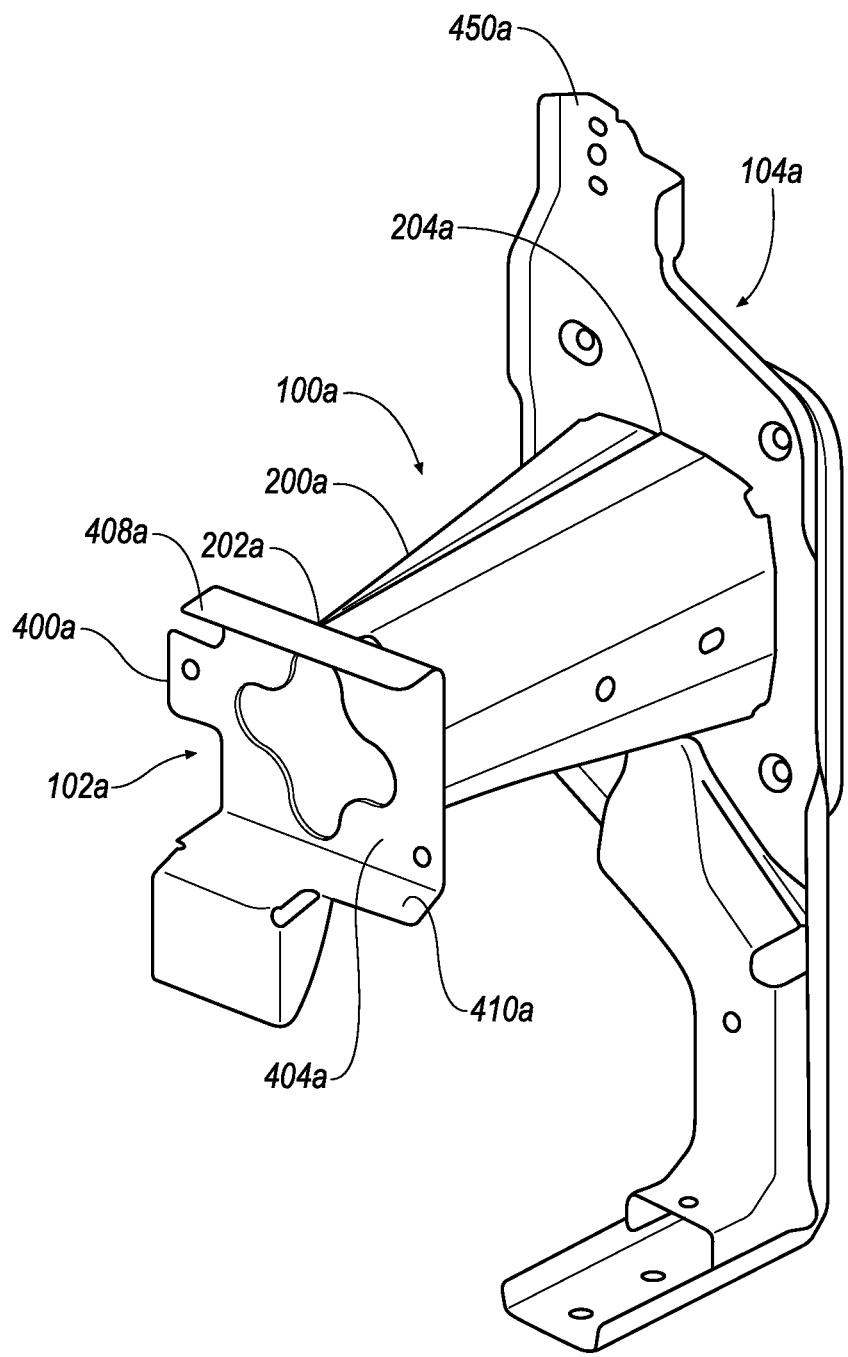
FIG. 2 is a perspective view of a crash box included in the vehicle frame assembly of FIG. 1.

With further reference to FIG. 2, the crash box 100a has a front end 102a and a rear end 104a. The rear end 104a of the crash box 100a is attached to a front end 42a of the frame member 40a (e.g., as shown in FIG. 1), and the crash box 100a extends in the longitudinal direction y1 in series between the bumper 20 and the frame member 40a, with the front end 102a of the crash box 100a being attached to the bumper 20 (e.g., as shown in FIG. 1). In some implementations, the first crash box component or outer sleeve 200a may be directly attached to the bumper 20 (not shown). For example, the first crash box component 200a may be welded to the bumper 20. Alternatively, as described below, the crash box 100a may include a front bracket 400a to attach the first crash box component 200a to the bumper 20. Similarly, the first crash box component 200a may be directly attached to the front end 42a of the frame member 40a (not shown) by, for example, welding, or as described below, the crash box 100a may include a rear bracket 450a to attach the first crash box component 200a to the frame member 40a.

The first crash box component 200a deforms before the relatively more robust joints between the first crash box component 200a and the bumper 20 and frame member 40a, whether the joints are directly between the first crash box component 200a, the bumper 20 and the frame member 40a, respectively, and/or include the front and rear brackets 400a, 450a. In either case, the attachments between the first crash box component 200a and the bumper 20, and the first crash box component 200a and the frame member 40a, may be stronger than the deformation strength of the first crash box component 200a. For example, the attachment between the first crash box component 200a and the bumper 20a may be maintained while the first crash box component 200a deforms during a vehicle impact event. Likewise, the attachment between the first crash box component 200a and the frame member 40a may be stronger than the deformation strength of the first crash box component 200a, so that the attachment may also be maintained in impact events. Accordingly, crash box 100a may maintain the connection between the bumper 20 and the frame member 40a, even upon deformation.

Figure 3:
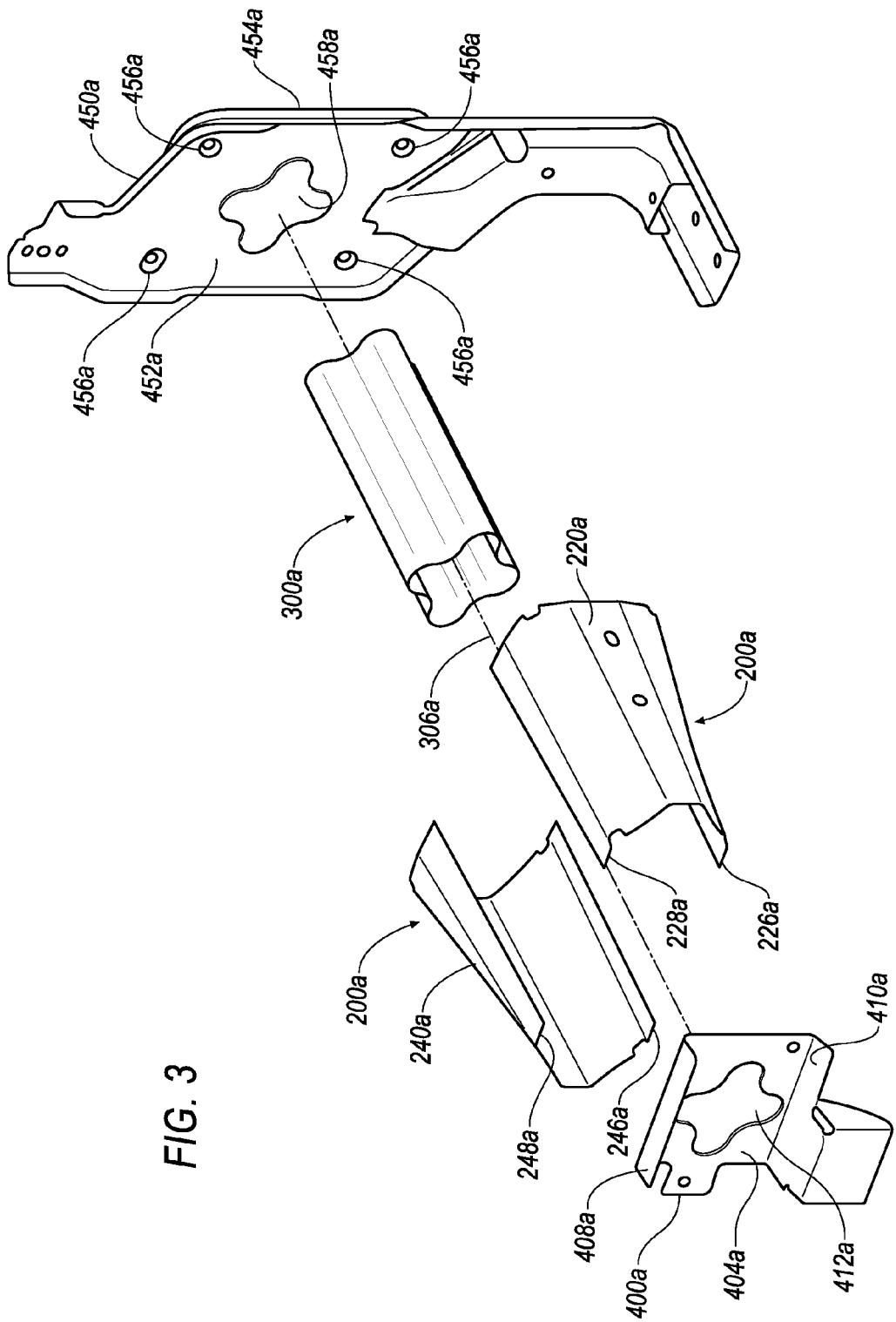
FIG. 3 is an exploded view of the crash box of FIG. 2.
Figure 4A:
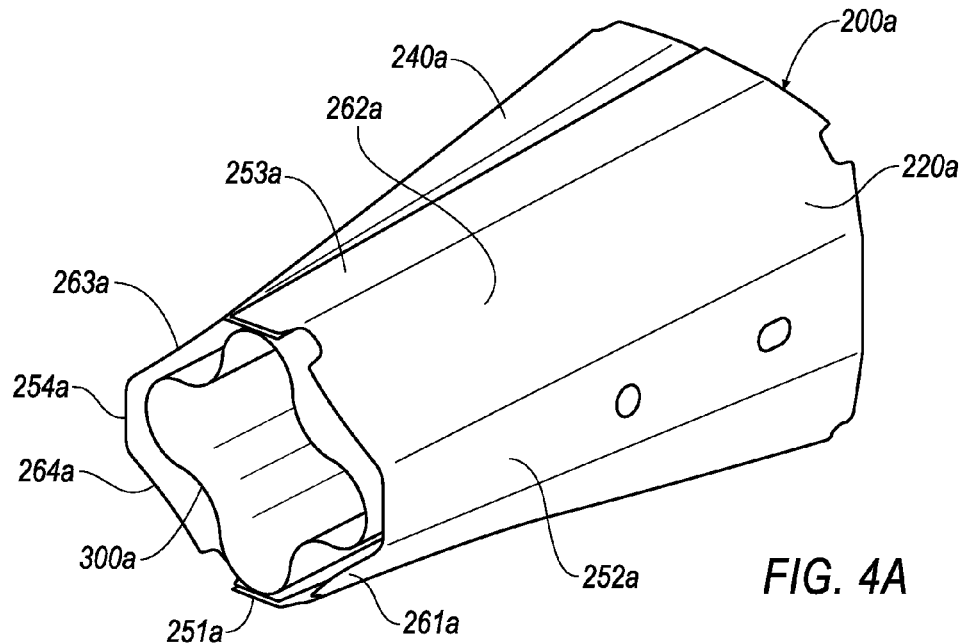
FIG. 4A is a perspective view of the first crash box component and second crash box component of the crash box of FIG. 2.
Figure 4B:
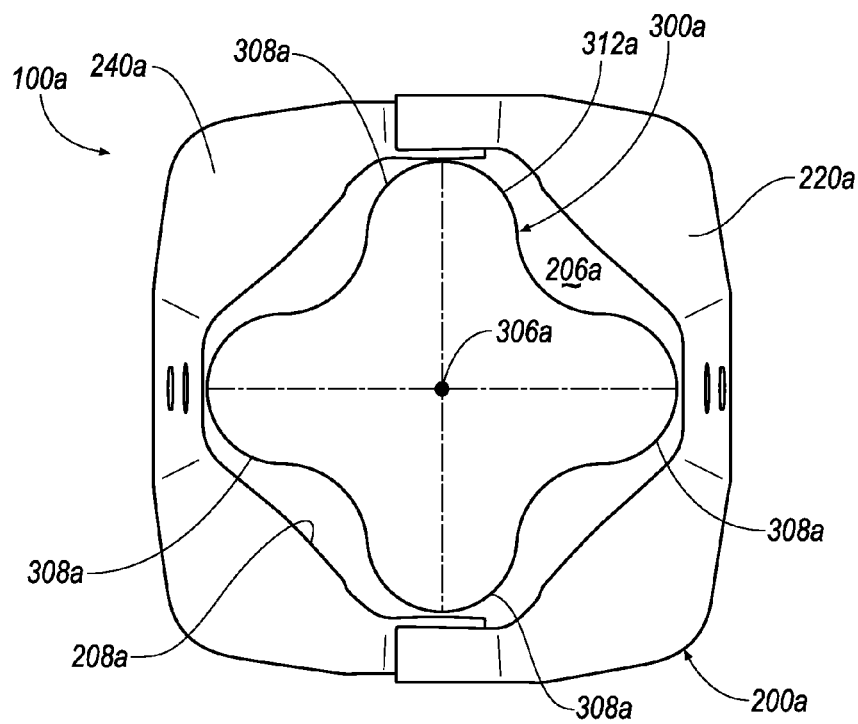
FIG. 4B is a front view of the first crash box component and second crash box component as shown in FIG. 4A.
Figure 5:
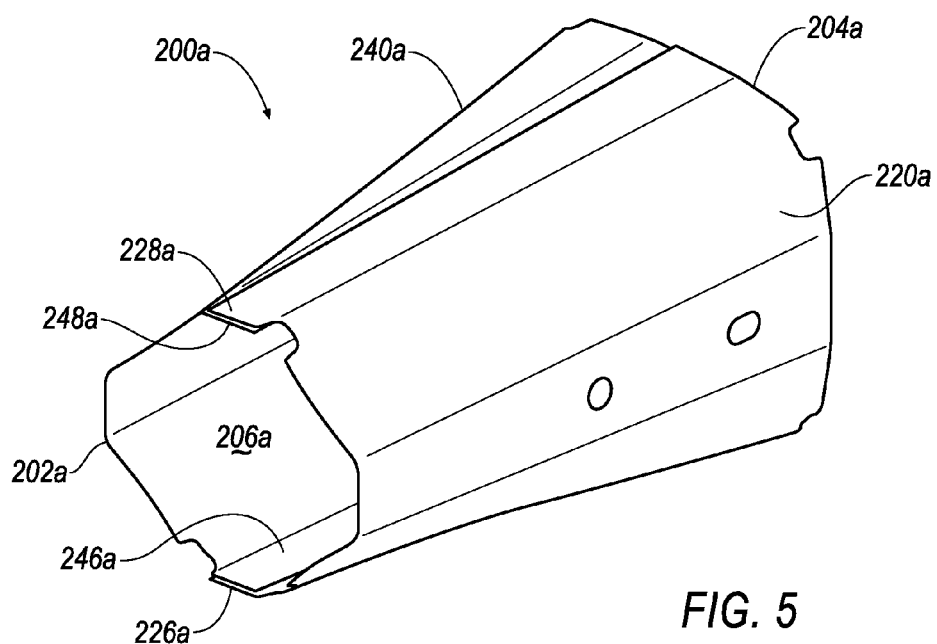
FIG. 5 is a perspective view of the first crash box component of the crash box of FIG. 2.

With further reference to FIGS. 3-5, the first crash box component 200a has a first end 202a and a second end 204a with a generally hollow configuration defining an inner region 206a. The first end 202a may have a cross-section that is smaller than a cross section of the second end 204a, and the first crash box component 200a may further be tapered along the length thereof, in the longitudinal direction y1, from the first end 202a to the second end 204a. A tapered shape of the first crash box component 200a may provide relatively increased energy absorption capacity by, for example, relatively increasing potential crush distance for a given length and material thickness of the first crash box component 200a by providing for telescopic buckling and thus facilitating the displacement of the first end 202a toward the larger second end 204a under sufficiently high compressive impact forces. The first crash box component 200a may be made, for example, of metal, such as non-hardened steel.

The first crash box component or outer sleeve 200a may include first and second portions 220a, 240a each oriented along the longitudinal direction y1. The first portion 220a may include bottom and top edge sections 226a, 228a, and the second portion 240a may include bottom and top edge section 246a, 248a. To form the first crash box component 200a, the first and second portions 220a, 240a engage at the bottom edge sections 226a, 246a and the top edge sections 228a, 248a, respectively, to enclose and define the inner region 206a. The first and second portions 220a, 240a may be joined in a variety of ways, e.g. welding, with fasteners, and/or with adhesive.

With particular reference to FIGS. 4A and 4B, in one implementation, the first crash box component 200a includes a generally octagonal cross-section at the first end 202a, and the first crash box component 200a enlarges and tapers along the length thereof to a substantially rounded square cross-section at the second end 204a. The first crash box component 200a includes four side sections 251a-254a and four corner sections 261a-264a alternating between two of the four side sections 251a-254a, respectively. As illustrated in FIGS. 4A-4B, each of the side sections 251a-254a and the corner sections 261a-264a are substantially planar at the first end 202a and are larger at the second end. The side sections 251a-254a remain substantially planar at the second end 204a and between the first and second ends 202a, 204a. The corner sections 261a-264a are incrementally curved between the first and second ends 202a, 204a, with each corner section 261a-264a having two generally orthogonal portions each substantially aligned with the adjacent ones of the side sections 251a-254a, respectively, as illustrated in FIGS. 4A-4B.

Figure 6:
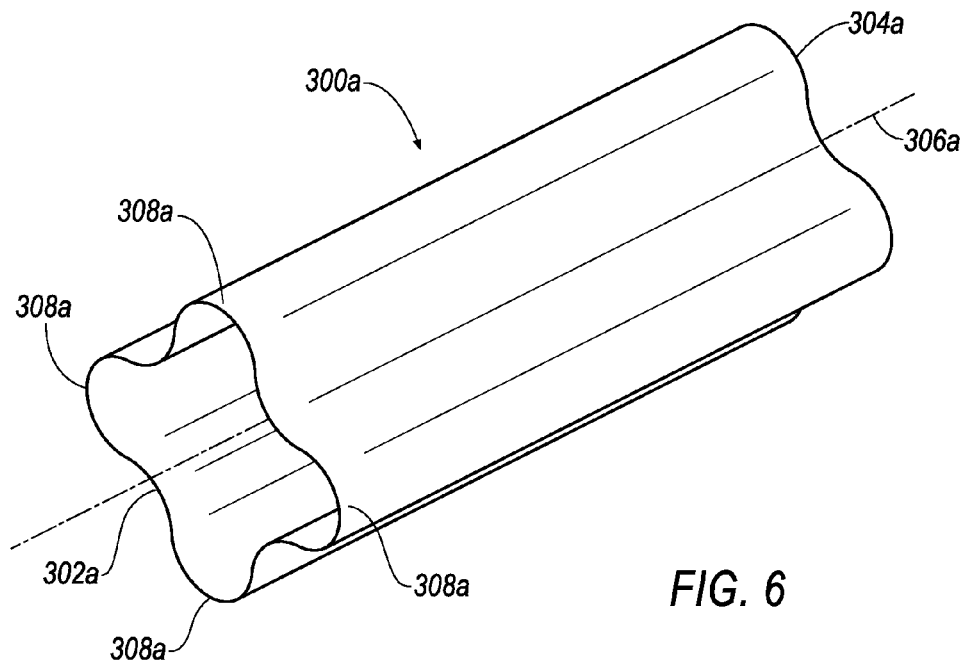
FIG. 6 is a perspective view of the second crash box component for the crash box of FIG. 2.

With continued reference to FIGS. 4A-4B, and further referring to FIG. 6, the second crash box component or inner tube 300a has a first end 302a and a second end 304a. The second crash box component 300a is disposed in the inner region 206a of the first crash box component 200a and extends in the longitudinal direction y1 from approximately the first end 202a of the first crash box component 200a to the second end 204a of the first crash box component 200a. The second crash box component 300a has a generally elongated configuration, that is, the length of the second crash box component 300a from the first end 202a to the second end 204a along the longitudinal direction y1 is larger than any of the dimensions of the cross section thereof. The second crash box component 300a may have uniform cross sections from the first end 302a to the second end 304a and may define an axis 306 extending along the length thereof, e.g. through a geometric center of the cross sectional shapes. The second crash box component 300a may be made of reinforced polymer, or other composite material. For example, the second crash box component 300 may be made of low density, high strength carbon fiber reinforced polymer. Providing the crash box 100a with a second crash box component 300a with a uniform cross-section and made of carbon fiber reinforced polymer can provide additional strength to the crash box 100a along the axis 306a. While the second crash box component 300a provides additional strength to the crash box 100a, due to its defragmentation in response to compressive forces, the second crash box component 300a is supported within the first crash box component 200a, as described below. Therefore, the crash box 100a may maintain the connection between the bumper 20 and the frame member 40a even upon deformation.

As shown in FIG. 6, the cross-section of the second crash box component 300a may be cross-like, with four rounded, elongated sections 308a radially extending about the axis 306a. The four elongated sections 308 may be configured to align with the side sections 251a-254a of the first crash box component 200a, respectively (FIGS. 5A, 5B). It should be understood that the second crash box component 300a may have a variety of configurations; for example, the cross-section thereof may be circular, square, a modified circle or square, etc.

According to the principles of the present disclosure, the first crash box component 200a supports the second crash box component 300a with the axis 306a aligned in the longitudinal direction y1, towards maximizing the energy absorption of the second crash box component 300a, and thus the crash box 100a, between the frame member 40a and the bumper 20. In one implementation, the second crash box component or inner tube 300a may be substantially the same length as the first crash box component or outer sleeve 200a. The first end 202a of the first crash box component 200 may be frictionally coupled, i.e. compression fit, into the first end 302a of the inner sleeve 300a such that the second crash box component 300a is held in place and extends in the longitudinal direction y1 between the frame member 40a and the bumper 20. In another implementation, in addition to or as an alternative to a compression fit, a glue or adhesive may be used to secure the second crash box component 300a relative to the first crash box component 200a. For example, an adhesive may be disposed between an outer surface 312a of the second crash box component 300a and an inner surface 208a of the first crash box component 200a.

Figure 7:
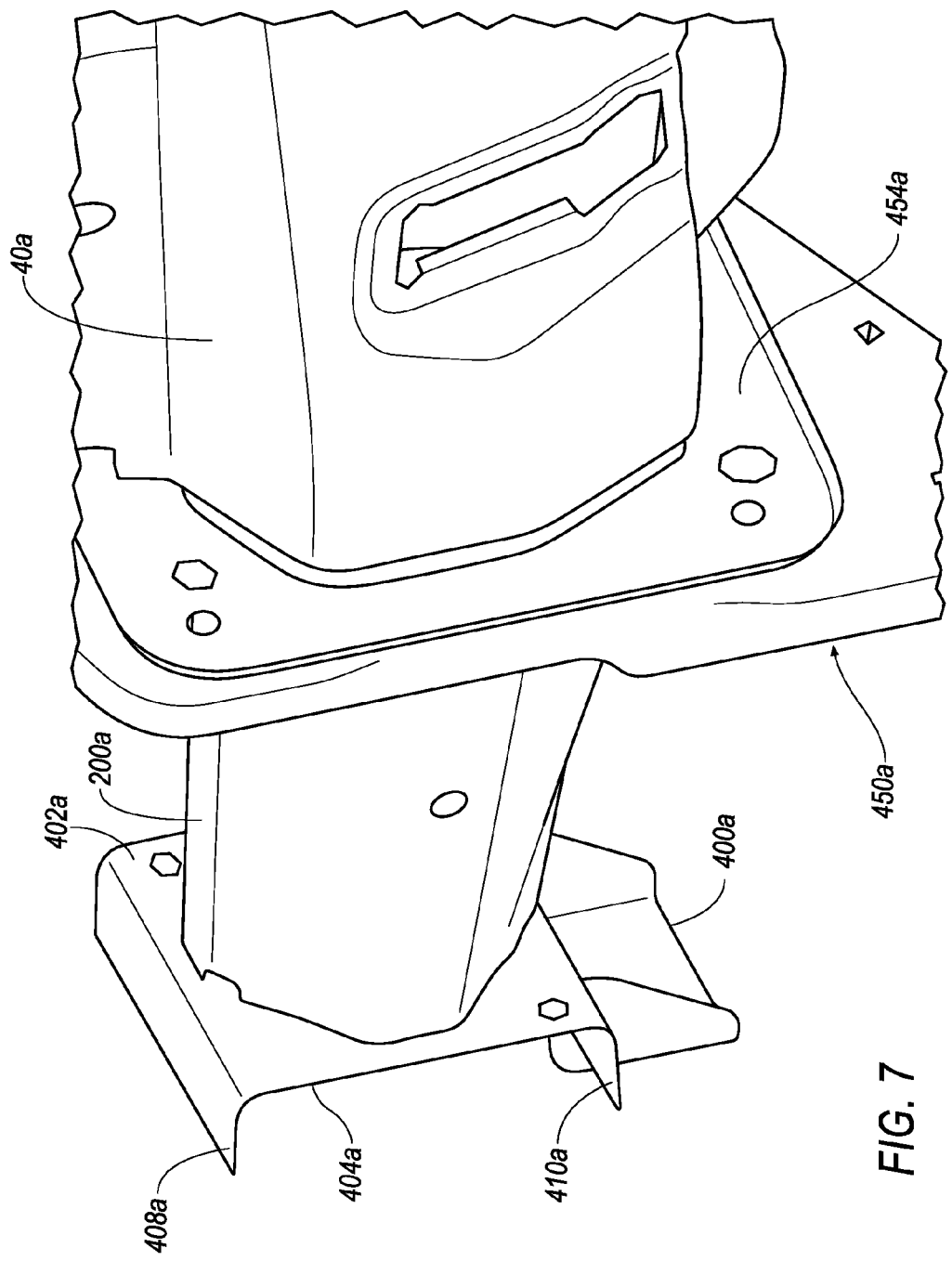
FIG. 7 is a perspective view of the crash box of FIG. 2, showing an interface between the first crash box component and the front bracket.

With continued reference to FIGS. 2 and 3 and further reference to FIG. 7, in some implementations, the crash box 100a may further include the front bracket 400a having a having a rear surface 402a attached to the first crash box component 200a, and a front surface 404a configured to receive the bumper 20. The front bracket 400a may be formed of a metal plate. The rear surface 402a may be welded to the front end 202a of the first crash box component 200a. The front bracket 400a may further have a top flange 408a and a bottom flange 410a extending in the longitudinal direction y1 away from the crash box 100a, and configured to receive the bumper 20. The front bracket 400a may be welded to the front bumper 20, bolted to the front bumper 20, etc. Additionally, a cavity 412a may be formed in the front bracket 400a for receiving the first end 302a of the second crash box component 300a.

With the first crash box component 200a and, in some implementations the front and rear brackets 400a, 450a substantially enclosing and supporting the second crash box component 300a, the crash box 100a may maintain the connection between the bumper 20 and the frame member 40a even upon deformation.

The crash box 100a may further include the rear bracket 450a having a front surface 452a attached to the second end 204a of the first crash box component 200a and a rear surface 454a configured to attach to the frame member 40a, such that the second crash box component 300a is fully enclosed within the inner region 206a formed by the first crash box component 200a, the front bracket 400a and the rear bracket 450a. The rear bracket 450a may be formed of a metal plate. The front surface 452a may be welded to the rear end 204a of the first crash box component 200a. The rear bracket 450a may define holes 456a for bolting the rear bracket 450a to the frame member 40a. As an alternative, the rear surface 454a may be welded to the frame member 40a. Additionally, a cavity 458a (FIG. 3) may be formed on the front surface 452a of the rear bracket 450a for receiving the second end 304a of the second crash box component 300a.

Figure 8:
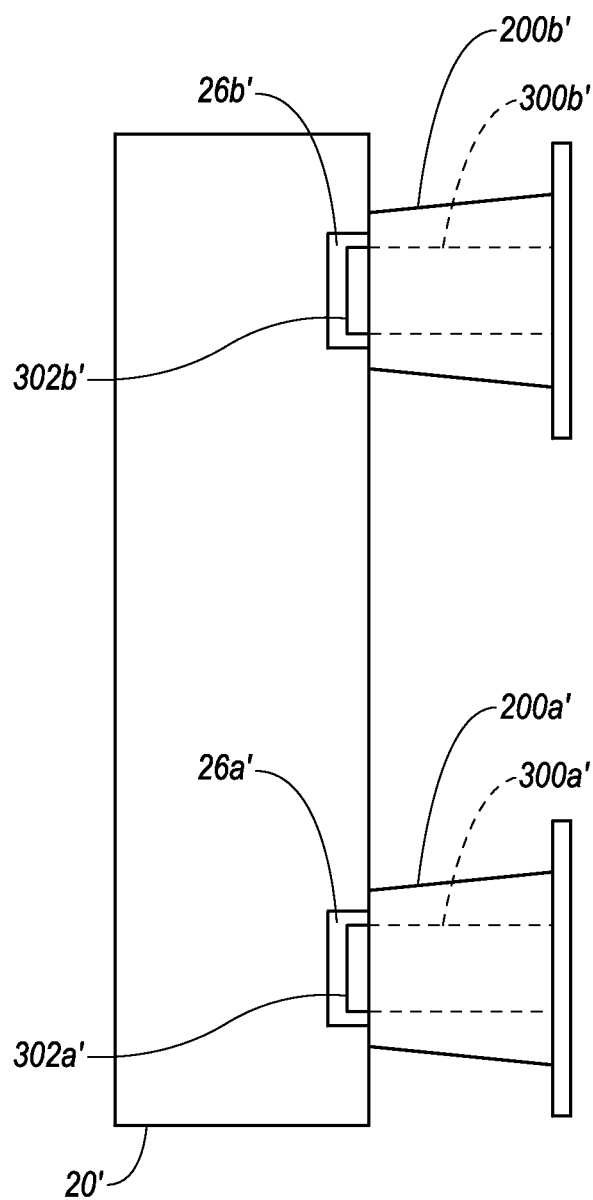
FIG. 8 is a diagram of another partial vehicle frame assembly including a crash box according to the principles of the present disclosure.

Another example for supporting second crash box components 300a', 300b' is shown in FIG. 8. In this example, first crash box components 200a', 200b' and second crash box components 300a', 300b' are similar to the first crash box assemblies 200a, 200b and second crash box assemblies 300a, 300b as described herein, except for the relative length of the first crash box components 200a', 200b' relative the length of the respective second crash box components 300a', 300b' as described below.

The second crash box components 300a', 300b' may be held in place by a bumper 20'. The second crash box components 300a', 300b' may be longer than first crash box component 200a', 200b'. The bumper 20' may include cavities 26a', 26b' for receiving and supporting the overlapping portions of the second crash box components 300a', 300b'. In particular, with the lengths of the second crash box components 300a', 300b' greater than the lengths of the first crash box components 200a', 200b', the first ends 302a', 302b' of the second crash box components 300a', 300b' may extend beyond the first ends 202a', 202b' of the first crash box component 200a', 200b' and into the cavities 26a', 26b'. The second crash box components 300a', 300b' may be secured to the bumper 20', for example, by compression fit and/or adhesive.

Figure 9:
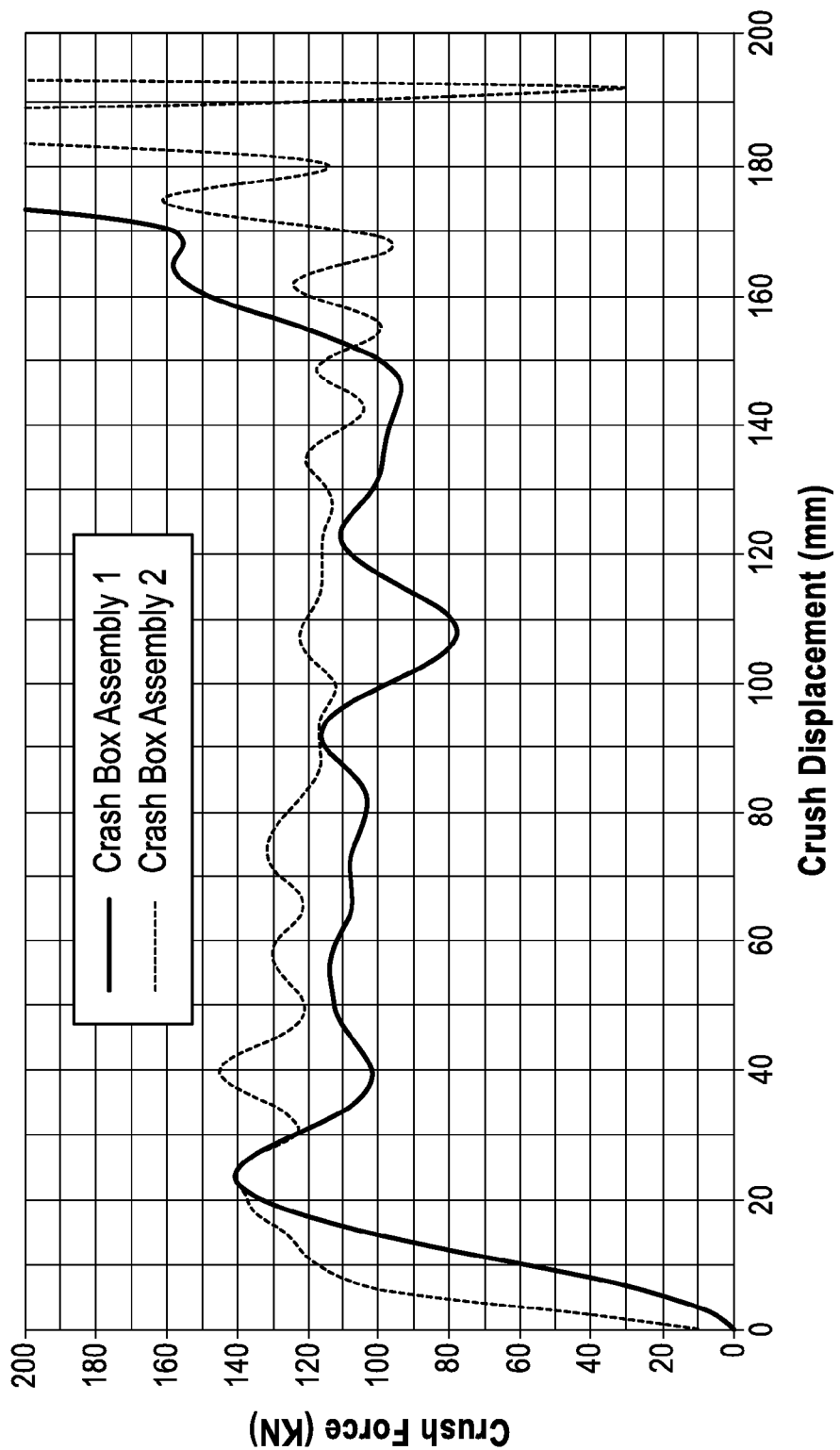
FIG. 9 is a graph of test results of two crash boxes, including one of the crash boxes configured according to the principles of the present disclosure.

FIG. 9 is a graph showing improved performance of a crash box according to the principles of the present disclosure as compared to a single component, metal only crash box. Vehicles with crash boxes having the characteristics identified in Table 1 were subjected to an impact with a rigid wall at a speed of 35 MPH.

TABLE 1

Characteristics of Tested Crash Boxes

|  | Crash box 1 | Crash box 2 |
| --- | --- | --- |
| Thickness of metal used to form first crash box component | 1.7 mm | 0.8 mm |
| Metal type | HSLA340 | HSLA340 |
| Material used for second crash box component | None | T700 Carbon Fiber/2510 Epoxy Prepreg ([0/90]$_{3s}$) |
| Weight of metal part | 0.933 Kg | 0.428 Kg |
| Weight of second crash box component | None | 0.177 Kg |
| Total weight | 0.933 Kg | 0.605 Kg |

In FIG. 9, the solid line shows the performance of the (base line) Crash Box 1 of Table 1 and the dotted line shows the performance of the Crash Box 2 of Table 1, in particular that the crush displacement of Crash Box 2 is approximately 9% greater than that of Crash Box 1. In addition, the total absorbed energy of Crash Box 2 is 13% higher than the total absorbed energy of Crash Box 1. Furthermore, as identified in Table 1, Crash Box 2 was less than two-thirds of the total weight of Crash Box 1.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It should be understood that, as used herein, exemplary refers to serving as an illustration or specimen, illustrative, or typical. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A vehicle frame assembly comprising:
a bumper extending in a lateral direction;
a frame member extending in a longitudinal direction;
a first crash box component attached between the bumper and the frame member, the first crash box component enclosing an inner region along the longitudinal direction, the first crash box made of metal, the first crash box component having a first end and a second end, the first end configured to attach to the bumper and the second end configured to attach to the frame member, the first end being smaller than the second end; and
a second crash box component extending within the inner region of the first crash box component, the second crash box component made of reinforced polymer and having a length aligned along the longitudinal direction and a substantially uniform cross-sectional shape along the length.

2. The vehicle frame assembly of claim 1, wherein the first end of the first crash box component is attached to the bumper and the second end is attached to the frame member, the first crash box component being tapered between the first end and the second end.

3. The vehicle frame assembly of claim 2, wherein the second crash box component is frictionally coupled with the first end of the first crash box component.

4. The vehicle frame assembly of claim 2, wherein the second crash box component is adhesively coupled with the first end of the first crash box component.

5. The vehicle frame assembly of claim 1, wherein the first crash box component has a first attachment with the bumper and a second attachment with the frame member, the first and second attachments being stronger than a deformation strength of the first crash box component.

6. The vehicle frame assembly of claim 1 wherein the bumper includes a cavity for supporting a first end of the second crash box component, the first end of the second crash box component extending beyond the first end of the first crash box component and into the cavity.

7. The vehicle frame assembly of claim 1, wherein the first crash box component is made of non-hardened steel.

8. The vehicle frame assembly of claim 1, wherein the second crash box component is made of carbon fiber reinforced polymer.

9. The vehicle frame assembly of claim 2, further comprising a front bracket having a rear surface directly attached to the first end of the first crash box component, the front bracket further having a front surface directly attached to the bumper.

10. The vehicle frame assembly of claim 9, further comprising a rear bracket having a front surface directly attached to the second end the first crash box component, the rear bracket further having a rear surface attached to the frame member, enclosing the second crash box component within the inner region of the first crash box component.

11. The vehicle frame assembly of claim 1, wherein the length of the second crash box component is substantially the same as a length of the first crash box component.

12. The vehicle frame assembly of claim 2, wherein the cross-section of the first end of the first crash box component has an octagonal shape with four side portions respectively alternating between four corner portions, and the cross-section of the second end has a substantially square shape.

13. The vehicle frame assembly of claim 12, wherein the cross-section of the second crash box component is cross-like with four elongated sections respectively aligned with one of the side portions of the first end of the first crash box component.

14. A crash box for connecting a bumper of a vehicle to a frame member of the vehicle comprising:
a first crash box component made of metal and enclosing an inner region, the first crash box component having a first end and a second end, the first end configured to attach to the bumper and the second end configured to attach to the frame member, the first end being smaller than the second end; and
a second crash box component extending within the inner region of the first crash box component, the second crash box component made of reinforced polymer and having a length and a substantially uniform cross-sectional shape along the length.

15. The crash box of claim 14, wherein the first crash box component includes first and second overlapping portions.

16. The crash box of claim 14, wherein the first crash box component is made of non-hardened steel and the second crash box component is made of carbon fiber reinforced polymer.

17. The crash box of claim 14, wherein the second crash box component is frictionally coupled with the first end of the first crash box component.

18. The crash box of claim 14, wherein the second crash box component is adhesively coupled with the first end of the first crash box component.

19. The crash box of claim 14, further comprising:
a front bracket having a rear surface directly attached to the first end of the first crash box component, and a front surface configured to receive the bumper, and
a rear bracket having a front surface directly attached to the second end of the first crash box component, and a rear surface configured to attach to the frame member of the vehicle.

* * * * *